United States Patent [19]
Chisholm

[11] 3,726,386
[45] Apr. 10, 1973

[54] DOUBLED LOOP INVERTING AND CONVEYING APPARATUS

[75] Inventor: Douglas S. Chisholm, Midland, Mich.

[73] Assignee: The Dow Chemical Company, Midland, Mich.

[22] Filed: Apr. 9, 1971

[21] Appl. No.: 132,751

Related U.S. Application Data

[60] Continuation-in-part of Ser. No. 13,218, Feb. 6, 1970, abandoned, which is a division of Ser. No. 685,867, Nov. 27, 1967, abandoned.

[52] U.S. Cl............................198/33 AC, 74/231 MB
[51] Int. Cl..............................................B65g 47/24
[58] Field of Search................198/33 AC, 184, 187, 198/165; 74/231 MB, 224, 225

[56] References Cited

UNITED STATES PATENTS 3,280,995  10/1966  Barkley............................198/33 AC
2,677,456   5/1954  McCann..............................198/184

FOREIGN PATENTS OR APPLICATIONS 818,684   8/1959  Great Britain...................198/33 AC Primary Examiner—Evon C. Blunk
Assistant Examiner—Douglas D. Watts
Attorney—Richard G. Waterman et al.

[57] ABSTRACT

Conveying apparatus, including a double looped belt with a twisted side trained about supporting pulleys, wherein an article may be introduced between the loops and be inverted while conveyed to the other end of said loop.

4 Claims, 11 Drawing Figures

PATENTED APR 10 1973

INVENTOR.
Douglas S. Chisholm
BY Robert B. Ingraham
AGENT

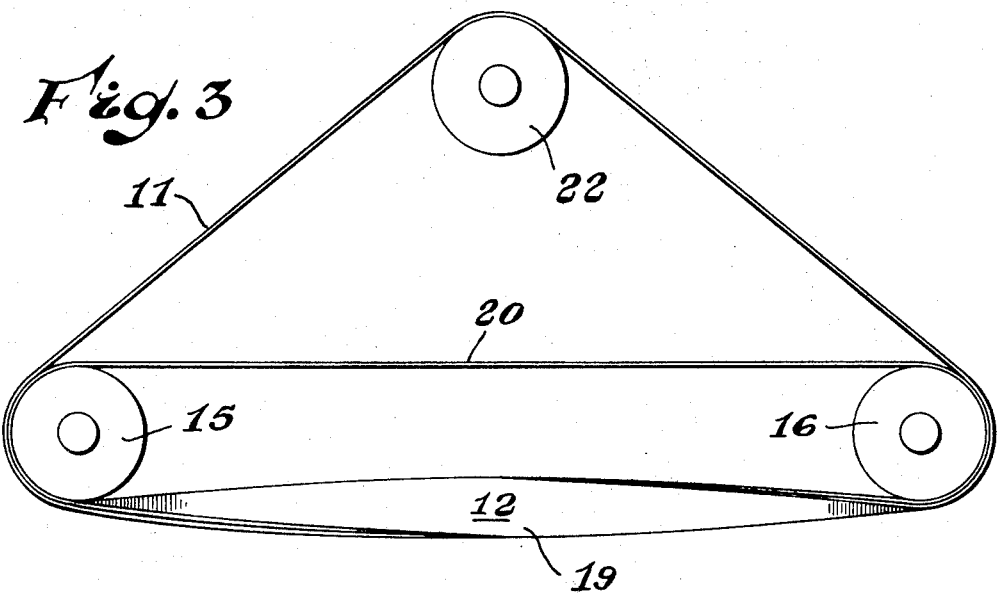
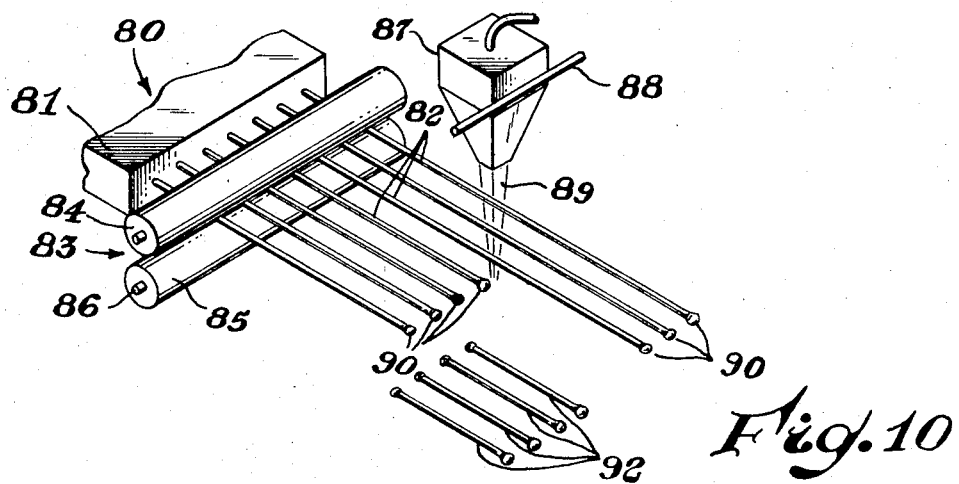
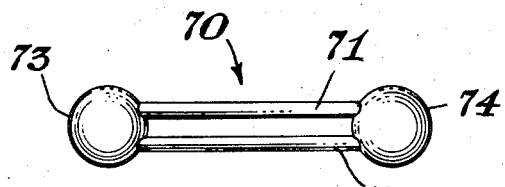
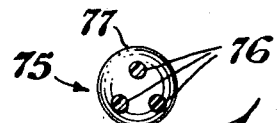
INVENTOR.
Douglas S. Chisholm
BY
Robert B. Ingraham
AGENT

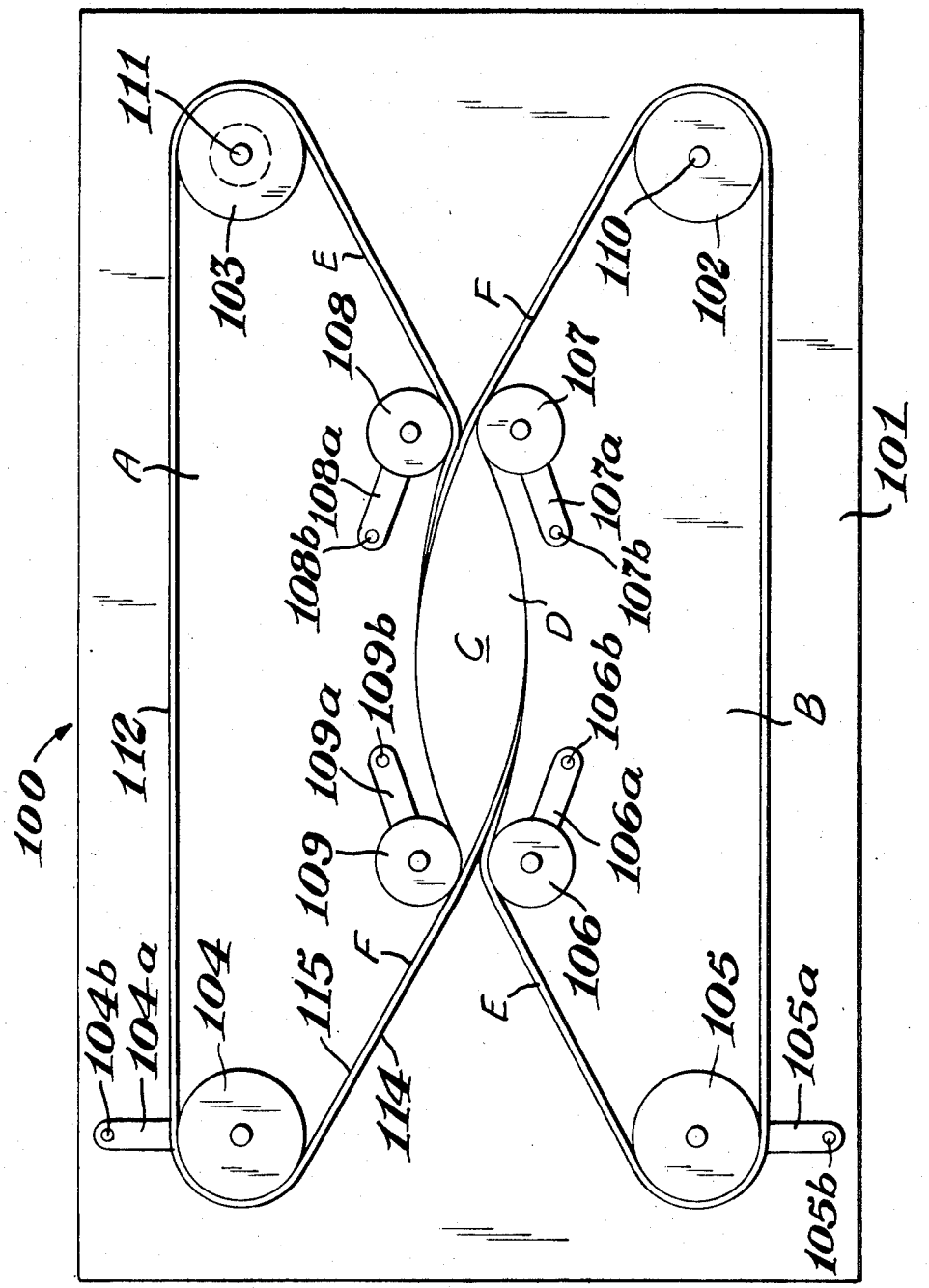

DOUBLED LOOP INVERTING AND CONVEYING APPARATUS

This application is a continuation-in-part of my copending application Ser. No. 13,218, now abandoned filed Feb. 6, 1970, which is a divisional application of my earlier filed application Ser. No. 685,867, filed Nov. 27, 1967, now abandoned.

This invention relates to a conveying apparatus, and more particularly relates to an apparatus for conveying and orienting bulbous terminal portions on elongate filamentary fusible bodies.

Many structural materials are reinforced by filamentary or elongate articles. In forming two phase materials which are reinforced by filamentary or elongate bodies, it is generally necessary that the reinforcing elements adhere to the matrix or at least be firmly anchored at their terminal portions and/or intermediate locations in order that maximum physical properties are achieved. One approach to this problem is shown in U.S. Pat. No. 1,976,832, wherein concrete is reinforced with dumbbell-shaped elements which in essence may be considered a nail with a head on each end. Somewhat similar reinforcing elements are disclosed in British Pat. No. 252,975. The heading of reinforcing elements is a relatively small problem when the reinforcing elements are relatively large. Such reinforcing elements may be molded, cast or formed by conventional heading procedures such as are employed in nail and bolt machines. In order to achieve maximum reinforcing from reinforcing elements in an adhering matrix and especially in a non-adhering matrix, it is desirable that the reinforcing element terminate in a configuration that provides mechanical anchoring in such a manner that a minimum stress concentration appears in the reinforcing element. Minimal stress concentration is achieved when a rod-like reinforcing element terminates in a smooth, generally uniformly curved surface such as a bulbous end. For optimum tensile strength, such a termination could have the form of a hemisphere wherein the rod smoothly flares into a generally hemispherical termination with the curved surface facing the body of the rod. However, sharp edges of such a configuration give rise to stress concentrations within the matrix, and it appears that an optimum configuration for such a reinforcing element is a rod terminating at either end in a generally spherical or bulbous configuration. For many applications, it is desirable that such reinforcing elements be extremely small. For example: in many applications of synthetic resins which are either cast or molded under heat and pressure, it is oftentimes desirable that relatively small high strength parts are obtained. Various forms of small diameter wire have been used on reinforcement in plastic materials and various chemical coatings utilized to promote adhesion between the reinforcing elements and the matrix. Glass fiber or filament reinforcing with synthetic resinous materials has found wide use. However, such reinforcement is usually only of value if adhesion is obtained and maintained between the matrix and reinforcing elements. Many chemical treatments are known for increasing the adhesion between glass fibers and various resinous matrixes. Oftentimes such treatments are relatively specific for a single polymer or narrow family of polymers. Similar problems are encountered with inorganic cementitious materials.

It would be highly desirable if there were available a method and apparatus for the formation of elongate fusible bodies terminating in a bulbous configuration.

It would also be desirable if such a method and apparatus were capable of continuous operation.

It would also be desirable if such an apparatus would permit the formation of bulbous ends on small diameter fusible bodies in a continuous manner and provide a desirable configuration.

It would be further desirable if there were available a method and apparatus for conveying a plurality of small objects which would permit end for end inversion with minimal difficulty.

These benefits and other advantages in accordance with the present invention are achieved in a conveying apparatus, the conveying apparatus comprising an endless belt, the endless belt having a first surface and a gripping surface, a first belt support and a second belt support, the belt forming two loops, the two loops having a common side, the common side being twisted and the remaining sides being planar, the twisted or common side of the belt being twisted at least 180° and the gripping surface of the belt on the twisted side being in face to face engagement.

The apparatus of the invention is advantageously utilized with a method for the preparation of filamentary articles having first and second ends, each of the ends terminating in a bulbous configuration, the method comprising supplying a fusible filament, applying energy to the filament at selected locations, the energy being sufficient to fuse the filament at the locations and transform the fused portions of the filament into liquid form causing the filament to separate into a plurality of elements, a sufficient quantity of the filament being heated that the surface tension of the heated material of the filament forms a generally bulbous configuration having a diameter greater than the filament, subsequently cooling the separated portions of the filament to a temperature sufficiently low that the bulbous terminations are solid.

One advantageous species of the method for operation of the apparatus of the present invention comprises supplying a fusible reinforcing filament in a zig-zag configuration, disposing the zig-zag reinforcing filament in a generally vertical plane, forming from the zig-zag configuration a plurality of individual reinforcing elements having a generally U-shaped configuration, the U-shaped elements being formed from the zig-zag configuration by heating the zig-zag reinforcing element at the lowermost portion to a melting temperature to cause separation of the zig-zag element into a plurality of inverted U's having bulbous terminal portions, subsequently cooling the terminal portions of molten material formed by heating of the zig-zag element to provide a bulbous termination. A particularly advantageous embodiment of the invention contemplates subsequently inverting the U-shaped elements, disposing the legs of the U's uppermost, fusing the lowermost portion of the U, thereby forming two separate rod-like reinforcing elements each having bulbous ends.

Further features and advantages of the present invention will become more apparent from the following specification taken in connection with the drawing wherein:

FIG. 1 schematically depicts an apparatus in accordance with the invention.

FIG. 3 is a plan view of the arrangement of the belt of FIG. 1.

FIGS. 5, 6, 7, 8 and 9 are reinforcing elements prepared in accordance with the method employed for operation of the apparatus of the present invention.

FIG. 10 schematically depicts an alternate method for the preparation of reinforcing elements.

FIG. 11 depicts an alternate conveyor in accordance with the invention.

Figures 1, 5, 6:
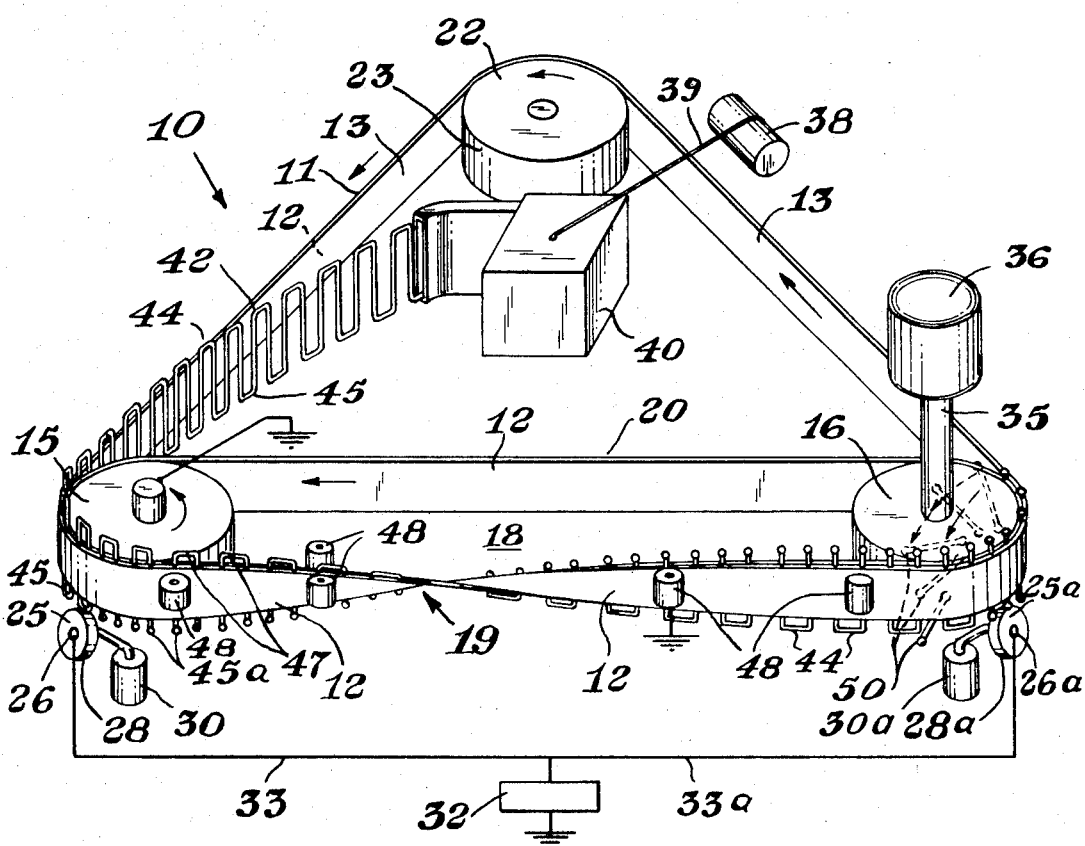

In FIG. 1 there is depicted one embodiment of the apparatus of the present invention generally designated by the reference numeral 10. The apparatus 10 comprises an endless belt designated by the reference numeral 11. The belt 11 has a first surface 12 and a gripping surface 13. The belt 11 is carried by a first belt support 15 and a second belt support 16. The belt forms a double loop 18 about the belt supports 15 and 16. The double loop 18 has a twisted side 19 and a generally planar or flat side 20. The twisted side 19 twists about the longitudinal axis of the belt at least 180° between the first belt support 15 and the second belt support 16. The generally planar side 20 of the double loop 18 is separated by a separator or idler pulley 22. The idler 22 has a belt supporting face 23. Advantageously, the belt 11 is of an electrically conducting metallic material and is adapted to progress about the supports 15 and 16 and the idler 22 as they are rotated in the direction indicated by the arrow. In association with the first belt support or drum 15 is a first electrode 25. The electrode 25 is adapted to rotate about a shaft 26 in such a manner that the periphery 28 of the electrode 25 generally faces the lower edge of the belt 11 as it passes about the drum 15. The shaft 26 is adjustably supported and electrically insulated by a first electrode support 30 carried by a base, not shown. A second electrode 25a is rotatably supported on a shaft 26a and the electrode 25a has a periphery 28a and is carried by a support 30a in a manner similar to the electrode 25. The periphery 28a of the electrode 25a faces the lower edge of the belt 11 passing over the second belt support 16. The lower edge of the belt at the support 16 was the upper edge of the belt at the support 15. The electrodes 25 and 25a are in operative association with a power source 32 by means of conductors 33 and 33a. One side of the power source 32 is connected to a ground return circuit, not shown. The belt supports 15 and 16 each are electrically connected to a ground return as indicated. The belt support 16 beneficially is in operative engagement with a driving means or shaft 35 which in turn is actuated by a motor 36 adapted to rotate the belt support or drum 16 in the direction indicated by the arrow. A means 38 to supply a fusible filamentary reinforcing strand 39 is disposed adjacent a filament forming means 40 which is particularly adapted to form the strand 39 into a zig-zag configuration. Such apparatus is well-known. One particular variety of such equipment is shown in U.S. Pat. No. 2,676,621. The forming apparatus 40 discharges a formed or zig-zag filament 42 which is disposed in a generally vertical plane as it is positioned between the gripping surface 13 of the belt 11 on the flat side of the double loop 18 adjacent the first belt support 15. The zig-zag filament 42 has a first series of bends 44 and a second series of oppositely disposed bends 45. The first series of bends 44 are disposed adjacent the electrode 25 wherein the material forming the bend is fused to form bulbous ends 45a and separate the zig-zag filament into a plurality of U-shaped members such as are depicted in FIG. 5. The twisted portions 19 of the double loop 18 has disposed between the gripping surface 13 a plurality of U-shaped elements 47 having the first bends 44 upwardly disposed. A plurality of compression rollers 48 are in contact with portions of the first surface 12 of the belt forcing the adjacent portions of the gripping surface 13 toward each other. Adjacent the second belt support 16, the first series of bends 44 are disposed adjacent the electrode 25a which fuses the material forming the bend causing separation of the legs of the U to form bulb-ended rod-like reinforcing members 50.

Figure 2:
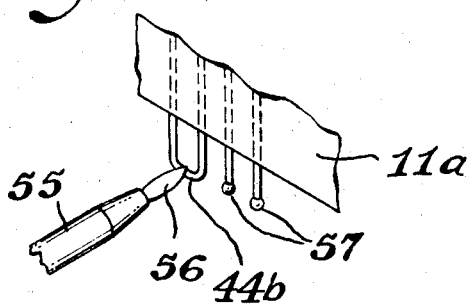
FIG. 2 depicts an alternate means of fusing the reinforcing elements.

FIG. 2 depicts an alternate fusing means designated by the reference numeral 55. The fusing means 55 comprises a flame 56 which impinges upon a bend 44b of a fusible filament to form a pair of bulbous ends 57 supported by a belt 11a.

In FIG. 3 there is depicted schematically the string-up arrangement of the belt 11 of FIG. 1 wherein all material not pertinent to the belt string-up has been omitted. As is obvious from the arrangement of FIG. 3, the idler or spacer 22 is readily omitted if the objects to be conveyed are readily slipped between the belt on the flat side 20.

Figure 4:
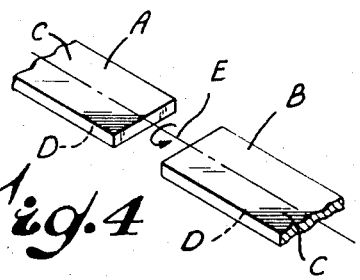
FIG. 4 is a schematic representation adapted to aid in preparing a belt such as the belt of FIGS. 1 and 3.

The belt employed in FIGS. 1 and 3 is readily prepared by forming the belt from a flat strip of stock which is partially illustrated in FIG. 4. The belt stock has a first end A and a second end B, a first surface C and a gripping surface D and a belt axis E. If the belt stock is formed into a generally cylindrical loop having ends A and B adjacent and either the end A or B is rotated 720°; that is, two full turns, and joined, the resultant belt is readily positioned in the manner illustrated in FIG. 3. The resultant endless belt conveniently is strung-up by placing any one of 180° twists on the first and second belt supports 15 and 16, the belt brought around the second support 16 to the support 15, placed underneath the portion of the belt already on the support 15, one of the 180° twists in the belt moved adjacent the first twist and the portion of the belt extending from the second support either passed over the idler or the supports moved apart to form the double loop.

In FIG. 5 there is depicted a U-shaped reinforcing element 47 having a first bend 44 and bulbous terminal ends 45a on the legs 58 and 59.

FIG. 6 depicts a rod-like reinforcing element 50 having a smooth bulbous terminal end 45a and a second end 44a of like configuration formed in part from the fusion of the bend 44 of the element 47 of FIG. 5.

Figure 7:
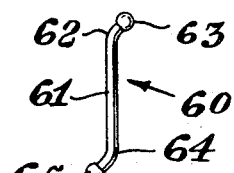

FIG. 7 is an alternate configuration of a reinforcing element generally designated by the reference numeral 60. The element 60 has an elongate rod-like body 61 which has a first curved portion 62 adjacent to the bulbous end 63, a second curved portion 64 remote from the portion 62 and terminating in a bulbous end 65.

In FIG. 8 there is depicted a reinforcing element prepared by the method employed for operation of the apparatus of the present invention and generally designated by the reference numeral 70. The element 70 comprises a first filament 71 and a second filament 72 disposed in generally parallel arrangement. Each of the filaments 71 and 72 terminate in common bulbous ends 73 and 74, respectively. Such filaments are formed by the fusion of adjacent filaments wherein the liquid portions fuse to provide a single bulbous end uniting the two filaments.

FIG. 9 depicts a sectional view of a reinforcing element generally designated by the reference numeral 75 which comprises a plurality of reinforcing filaments 76 terminating in a first bulbous termination 77 and a second bulbous termination, not shown.

In FIG. 10 there is depicted an apparatus generally designated by the reference numeral 80 suitable for the practice of the present invention. The apparatus 80 comprises in cooperative combination a source or supply 81 of fusible reinforcing filaments designated by the reference numeral 82. The filaments 82 issue from the source 81 and contact a forwarding means 83 comprising first and second nip rolls 84 and 85 which are in operative engagement with a driving means 86 and are adapted to forward the filaments 82 away from the source 81. An electromagnetic radiation source 87 such as a laser is disposed adjacent the filaments 82 and is operatively supported by a traversing means 88 adapted to cause the source 87 to travel in a direction generally normal to the longitudinal axes of the fibers 82. A focused beam of electromagnetic radiation 89 issues from the source 87. The beam 89 contacts the filaments 82 forming on each filament a bulbous termination 90 and severing therefrom elongate bulb-ended reinforcing filaments 92.

In FIG. 11 there is depicted an alternate conveyor generally designated by the reference numeral 100. The conveyor 100 comprises a base member 101 and a plurality of pivotally supported belt supports 102, 103, 104, 105, 106, 107, 108 and 109. The support 103 is rotatably supported on a shaft 110 affixed to the base 101. The support 103 is supported by a support 111 similarly affixed to the base 101. The rotatable base supports 104, 105, 106, 107, 108 and 109 are rotatably affixed to arms 104a, 105a, 106a, 107a, 108a and 109a. The arms in turn are resiliently supported by torsion bars 104b, 105b, 106b, 107b, 108b and 109b to thereby resiliently tension the support members 104, 105, 106, 107, 108 and 109 toward the surface of a belt 112 shown in engagement with the belt supports 102, 103, 104, 105, 106, 107, 108 and 109. The belt 112 has a gripping surface 114 and a first surface 115. The belt 112 has a first loop designated by the reference character A and a second loop designated by the reference character B. The loops A and B have a common side C wherein the gripping surface 114 is in contact with itself, and a twist D of about 180° is in the common side which lies between the belt supports 106 and 109 and the supports 107 and 108. The portions of the belt designated by the reference numeral E are separated by about the distance between supports 108 and 109 as are the portions of the belt designated F. The belt 112, prior to placing on the supports, has the same configuration as the belt 11 of FIG. 1. The belt 112 is readily positioned on the appropriate supports by first placing a 180° twist between the supports 106 and 109 and 107 and 108 and positioning the remaining portion of the belt as depicted in FIG. 11.

Positioning of the belts can be materially aided by placing them on a flat surface more or less with the belt on edge in a figure "8" configuration and manipulating the twists in the belt into the general configuration of the belt 112 of FIG. 11. The embodiment of FIG. 11 in some instances offers substantial advantage over the embodiment of FIG. 1 in that feed to the inverting portion of the belt is accomplished with greater ease. The use of resilient mounting with the belt supports permits relatively large articles to be passed therethrough. It should be noted that in FIG. 11 the thickness of the belt has been greatly exaggerated in order to provide a clear view of the manner in which it is strung on the supports.

In the practice of the method employed for operation of the apparatus of the present invention, both metallic and non-metallic filaments are readily formed into reinforcing elements by localized heating of such filaments to the point where they become molten and surface tension causes contraction of the molten portions into a generally spheroidal configuration having a diameter in excess of the original filament.

The heating means employed to separate a filament into a plurality of bulbous-ended reinforcing elements are many and varied and the precise choice will depend on the nature of the filament to be formed. For example, resistance heating is beneficially employed with metal filaments such as wire, alone or in combination with electric arc, gas flame, plasma jet, induction heating and the like. Non-conductive filaments such as inorganic glasses, plastics and the like are conveniently heated by such means as plasma jets, gas flames, conduction heating, convection heating, electromagnetic heating such as a laser beam, arc image furnaces, infrared, ultraviolet and/or visible light, dielectric heating and the like. Generally, it is desirable to heat a portion of the filament from about 2 to 6 diameters in length depending primarily upon the size of the terminal bulbous portion desired. In general, the longer the section of the filament is heated, the greater will be the diameter of the bulbous terminal end formed by the reduction of surface due to surface tension on the molten material.

In forming the bulb-ended termination by the fusion of a filament, consideration must be given to the relative effects of gravity and the surface tension of the molten filament portion. Very small bulb-ended filaments up to about 10 mils in diameter are formed with the filament oriented in almost any desired direction as the surface tension greatly offsets the effect of gravity and a bulb-ended termination of the sufficient symmetry for practical purposes is obtained. As larger filaments are employed; that is, from about 10 mils to 100 mils and larger, usually it is desirable to sever the reinforcing filament in such a manner that the portion of the filament which will form the bulbous terminations is disposed generally vertically downward. This is readily accomplished by bending the filament into a U-shaped configuration with the legs generally vertically upwardly disposed, fusing the lower portion of the U to form two dependent drops of liquid on each of the legs of what was the U and permitting time to cool and/or harden. Usually, in order to provide bulbous terminations on reinforcing filaments of like sizes, it is desirable to heat the reinforcing filament in a non-uniform manner. Fortunately, such non-uniform heating is normally achieved when a relatively small heat source is employed. Thus, if a zone, for example, 5 diameters in length, is being heated, inherently a temperature gradient exists wherein the region of maximum temperature is generally centrally disposed. With most materials, viscosity and surface tension decrease with increased temperature and the resultant bulbous terminations are of generally like size.

Beneficially, the length of the filament to be heated is readily varied if a sharply focused electromagnetic beam is employed. A relatively short length of the filament is heated if the beam is focused directly on the filament, and proportionately longer lengths are heated as the filaments are moved from the focal point. Such a technique provides ready control of the relative size of the bulb on the filament.

In the practice of the method employed for operation of the apparatus of the present invention as embodied in FIG. 1, it is generally desirable to maintain the zig-zag filament in a generally vertical plane; that is, one with a set of bends being upwardly disposed and a second set of bends being downwardly disposed during fusion, in order that a smooth configuration is obtained when the fused material cools. Both surface tension and gravity affect the ultimate configuration of the terminal end of the reinforcing element and if the fusion is done on the upper loop, a more or less mushroom-shaped ball appears on the larger filaments, depending on the energy input and the viscosity of the melt. With most metals, the melt viscosity is relatively low, and to obtain optimum reinforcing characteristics, fusion should be accomplished in such a manner that the freshly formed ends are directed downward.

Generally in the preparation of most metallic reinforcing elements, sufficient heat is readily applied by means of the electrodes 25 and 25a to form desirable bulbous ends. However, if desired, the zig-zag filament may be pre-heated to a temperature somewhat below the fusion point prior to being passed over the electrodes or other heating means employed to fuse and form the bulbous ends.

Employing apparatus generally as depicted in FIG. 1, 30 mil diameter bulbs are readily formed on 20 mil diameter wire wherein the endless belt is formed from 10 mil thick copper. Advantageously, graphite electrodes are employed to prevent pitting. Sufficient electrical contact is maintained with steel supports such as the supports 15 and 16 of FIG. 1 that no significant difficulty is encountered. Because of thermal expansion, generally it is advisable to employ the separator 22 as a loaded idler to maintain desired belt tension.

By way of further illustration, a carbon dioxide gas laser having an output of about one hundred watts is employed to cut a plurality of parallel glass filaments each having a diameter of about 0.0015 inch. Moving the filaments through the laser beam results in a plurality of bulb-ended glass reinforcing filaments wherein the bulbs are about three fiber diameters. Generally similar results are obtained when a black iron wire having a diameter of about 0.014 inch is severed by the laser beam. Employing the arc image furnace, nylon 66 filaments (a linear polyamide of hexamethylene-diamine and adipic acid) having diameters of about 0.003 mil are severed to provide a plurality of reinforcing filaments having bulbous terminations.

The glass and metal bulb-ended filaments of the foregoing illustrations are incorporated in polyethylene, polyvinyl chloride, polystyrene and nylon by mixing with a melt of each resin to form a reinforced composition about twenty weight percent of the reinforcing filaments. Glass, metal and nylon filaments separately are admixed with a hardenable epoxy resin mixture which is subsequently hardened to provide reinforced bodies containing about 25 weight percent bulb-ended reinforcing filaments.

If reinforcing elements are desired having one filament with bulbous terminal ends, the filaments must be separated by a sufficient distance that the melted portion of the filaments do not come together to provide configurations such as are depicted in FIGS. 8 and 9. If it is desired to provide a plurality of filaments joining bulbous terminations, these are readily obtained by feeding strands having the desired number of filaments to a heat source in closely spaced relationship to promote the fusion of the terminal portion into common bulbous terminations.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A conveying apparatus comprising
an endless belt, the endless belt having
a first surface and
a gripping surface,
a first belt support and
a second belt support, the belt forming
a double loop about the first and second belt supports, the double loop having
a twisted side and
a planar side extending between the belt supports, the twisted side of the double loop of the belt being twisted at least 180° between the two belt supports and the gripping face of the belt being in face to face engagement where the belt forms the double loop on the twisted side.

2. The conveyor of claim 1 including a separator disposed between portions of the belt on the flat side thereof.

3. The apparatus of claim 1 including means to cause the endless loop to progress about the first and second belt supports wherein the twisted side progresses from the first belt support to the second belt support.

4. The apparatus of claim 3 including means to continually supply a material between the gripping face of the belt adjacent the first belt support.

* * * * *